(12) United States Patent
Stimpfl

(10) Patent No.: US 7,255,638 B2
(45) Date of Patent: Aug. 14, 2007

(54) HANDLING SYSTEM FOR SAUSAGES

(76) Inventor: Christof Stimpfl, Hoferweg 2, 88267, Vogt (DE)

( * ) Notice: Subject to any disclaimer, the term of this patent is extended or adjusted under 35 U.S.C. 154(b) by 649 days.

(21) Appl. No.: 10/712,647

(22) Filed: Nov. 12, 2003

(65) Prior Publication Data

US 2004/0142650 A1 Jul. 22, 2004

(30) Foreign Application Priority Data

Nov. 12, 2002 (DE) ............................... 102 52 876

(51) Int. Cl.
*A22C 11/00* (2006.01)

(52) U.S. Cl. ....................................... 452/32

(58) Field of Classification Search .................... None
See application file for complete search history.

(56) References Cited

FOREIGN PATENT DOCUMENTS

DE 250 627 A3 * 10/1987

* cited by examiner

*Primary Examiner*—Thomas Price
(74) *Attorney, Agent, or Firm*—Bachman & LaPointe, P.C.

(57) ABSTRACT

A handling system for sausages (1) wherein sausages are suspended on strings (9), on carriers in a supporting frame for handling sausages (1) on smoke sticks (8), wherein the supporting frame (2) includes a handling device (3) with a gripping device for removing the carriers from and/or inserting the carriers into the supporting frame (2).

17 Claims, 5 Drawing Sheets

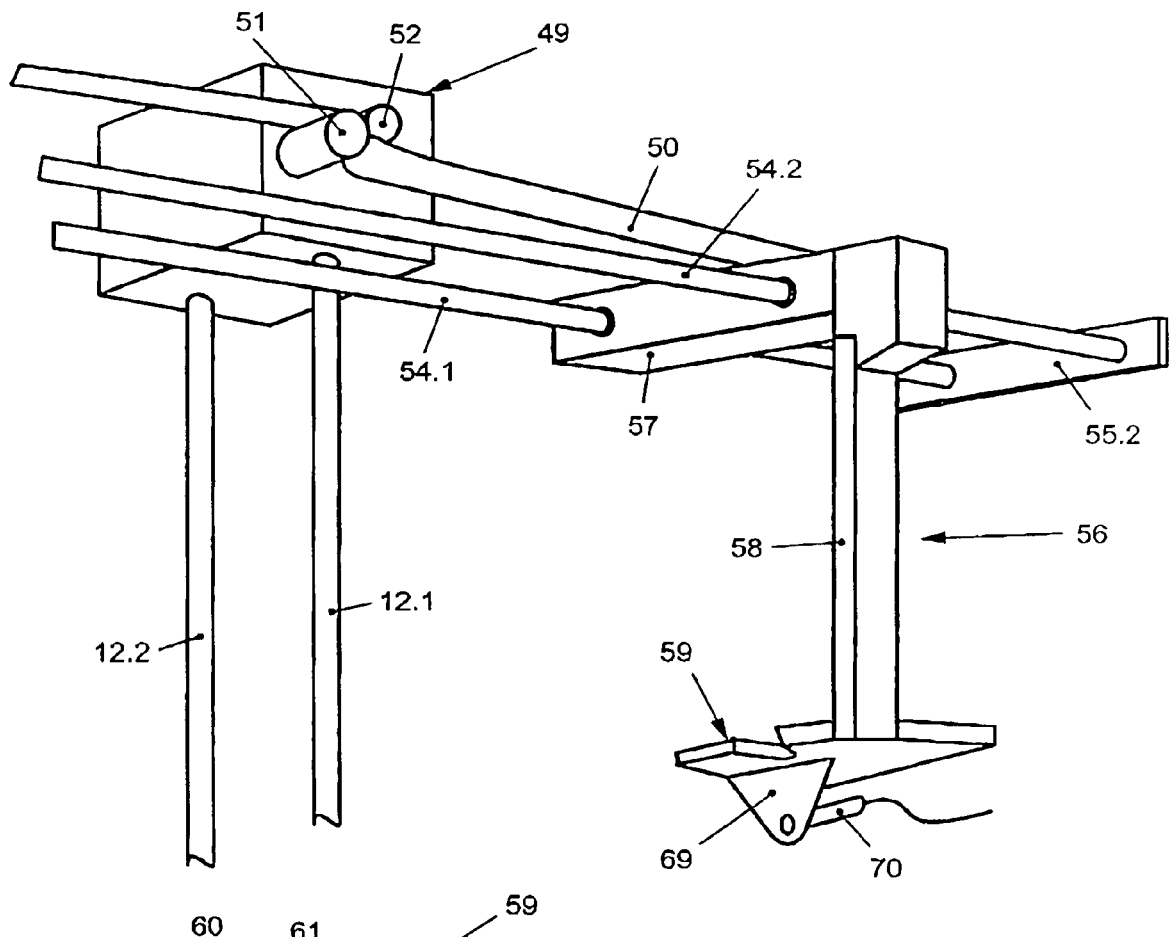
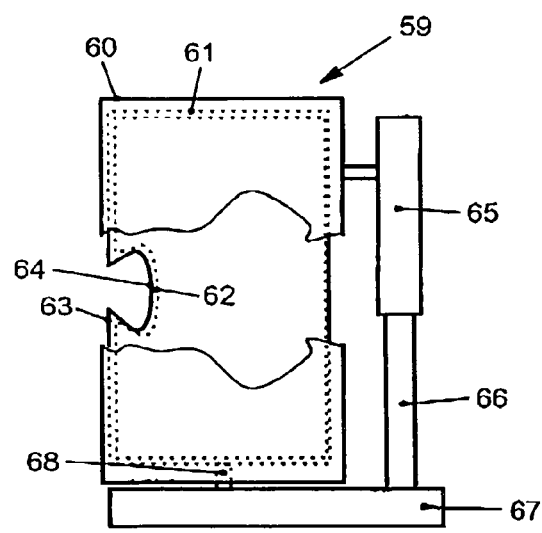
Fig. 5
Fig. 6 ive device always remains the same at least in the operational position. For example, the transporting device can be connected for this purpose rotatably at one end to the frame and can be connected at the other end to the vertical slide via a chain, for example.

HANDLING SYSTEM FOR SAUSAGES

BACKGROUND OF THE INVENTION

The invention relates to a handling system for sausages which are suspended on strings, on carriers in a supporting frame, trolleys or the like, in particular for handling sausages on smoke sticks.

In particular for smoke-drying, sausages are suspended on smoke rods and left, for example, in a smoke-drying chamber for a prolonged period. A multiplicity of sausages are situated on smoke sticks of this type, and the smoke sticks are thus relatively heavy. Up to now, the smoke sticks have been provided with sausages, then suspended in smoking chambers and removed from them and placed into trolleys by hand. This requires a considerable effort.

The present invention is based on the object of substantially facilitating the handling of carriers of the type mentioned above, in particular of smoke sticks.

SUMMARY OF THE INVENTION

The foregoing object is achieved by the supporting frame being assigned a handling device with a gripping device for removing the carriers from and/or inserting the carriers into the supporting frame.

In accordance with the invention, the handling of the carriers, in particular of the smoke sticks, no longer has to be carried out only by a person, but rather is automated. This automation applies particularly in respect of a gripping device in the handling device, the gripping device replacing the human activity.

In one preferred exemplary embodiment of the invention, the gripping device has a horizontally extendable gripping arm on which a gripper is situated. This arrangement may, for example, be situated on a vertical slide which can also be adjusted vertically along corresponding guide pillars. This makes it possible to pick up a smoke stick at any desired height and to deposit it again at any desired height.

The movement of the gripping device preferably takes place by means of toothed belts which are driven by servomotors. This makes it possible to very precisely convey the smoke sticks and other processing stations.

Above all, proximity sensors which determine, for example, the approach of smoke sticks with the greatest precision are also used to control the gripping device. Since the smoke sticks are generally made of metal, commercially available proximity sensors can be used. If the smoke sticks should be made from a different material, the smoke sticks have merely to be provided with markings to which the sensors react.

Clamping devices, which can likewise be designed as desired, are used for securing the smoke sticks on the gripping arm. The ejection from the clamping device is brought about by means of a corresponding ejection device, for example a piston rod of a pneumatic cylinder. However, this is just one exemplary embodiment. Many possibilities which are to be encompassed by the present inventive concept are conceivable.

It is furthermore provided to assign a transporting device to the gripping device, so that the handling device according to the invention can not only displace the smoke sticks, but it can also transport the sausages to the packaging device, for example.

The transporting device is preferably arranged below the gripping device and is coupled to the latter. This means that the distance between the transporting device and gripping In order to cut off the sausages from the smoke sticks, a cutting device is furthermore provided in the handling device. This cutting device is to be moveable transversely on guide rails, so that the sausages or the strings, with which the sausages are suspended on the smoke rods, can be conveyed without difficulties.

So that the cutting device recognizes a cutting position, provision is made to provide the string with a clip, if a clip has not been provided from the outset. The clip is recognized by a corresponding approach sensor in the cutting device. The cutting device itself can be of any desired design.

In the design with a gripping device, transporting device and cutting device, the handling station is an independent processing station. However, there is also the possibility of designing the handling station merely as a transfer station, in which case the gripping device described above suffices. It can be used to transfer a smoke stick, for example, from one trolley into the other, this being just one example. In this case, the gripping device is preferably of rotatable design.

BRIEF DESCRIPTION OF THE DRAWINGS

Further advantages, features and details of the invention emerge from the following description of preferred exemplary embodiments and with reference to the drawing.

FIG. 5: shows a perspective view illustrated on an enlarged scale of a cutting device; and FIG. 6: shows a plan view illustrated on an enlarged scale of a cutting element used in the cutting device according to FIG. 5.

DETAILED DESCRIPTION

Figure 1:
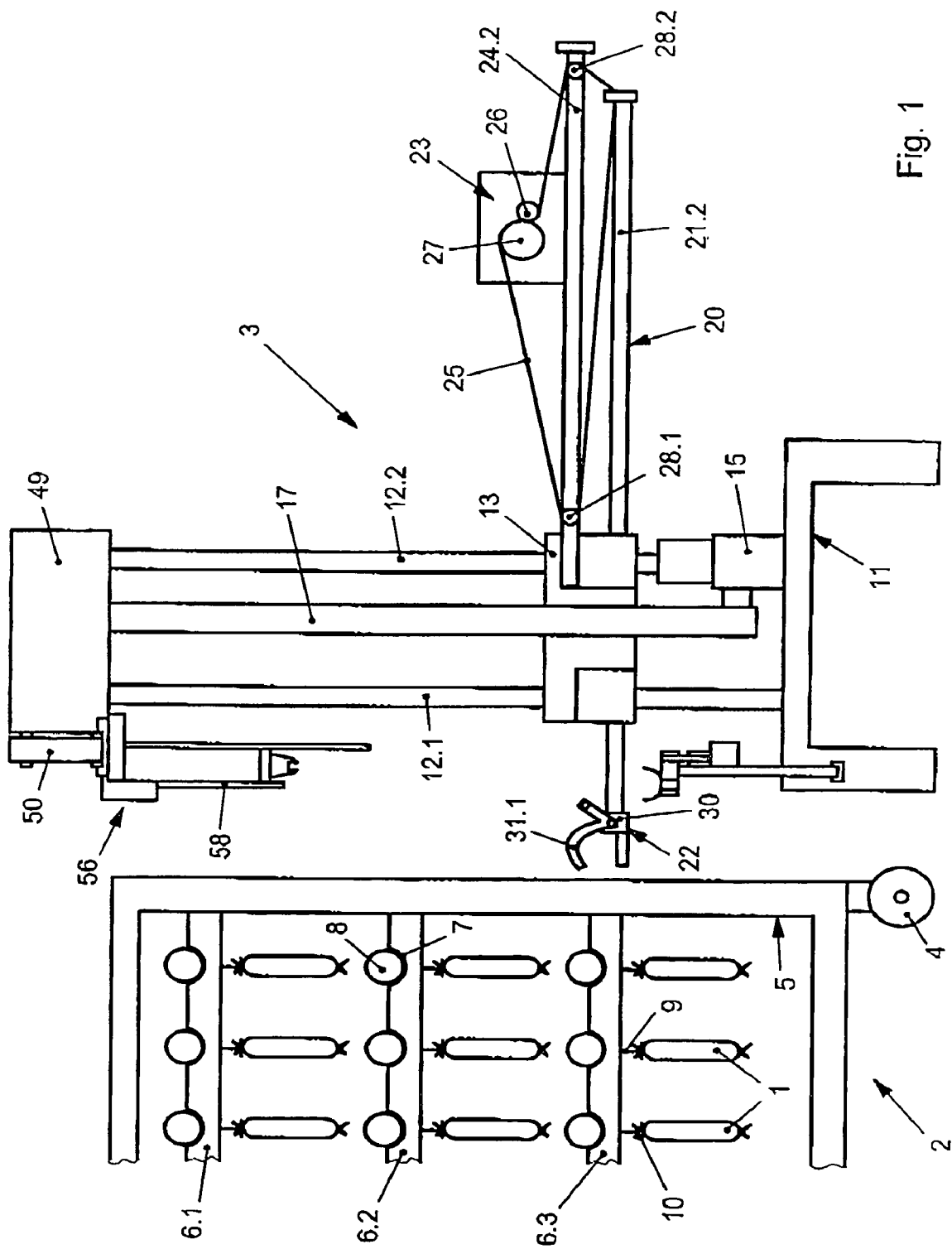
FIG. 1: shows a schematic side view of a handling system according to the invention for sausages.

A handling system for sausages 1, which is illustrated in FIG. 1, comprises a trolley 2 and a handling device 3, it being possible for the trolley 2 to be designed such that it can be moved by means of wheels 4 and being assigned to the handling device 3.

The trolley 2 comprises an open transporting frame 5 into which longitudinal carriers 6.1 to 6.3, which are spaced apart from one another, are fitted. Situated spaced apart in the longitudinal carriers 6.1 to 6.3 are receiving troughs 7 for receiving smoke sticks 8, on which the sausages 1 are likewise suspended spaced apart. In this case, the sausages 1 are connected to the smoke stick 8 via strings 9, the strings 9 forming a corresponding loop (not shown specifically). A preferably metallic clip 10 is situated on the string 9.

Figure 2:
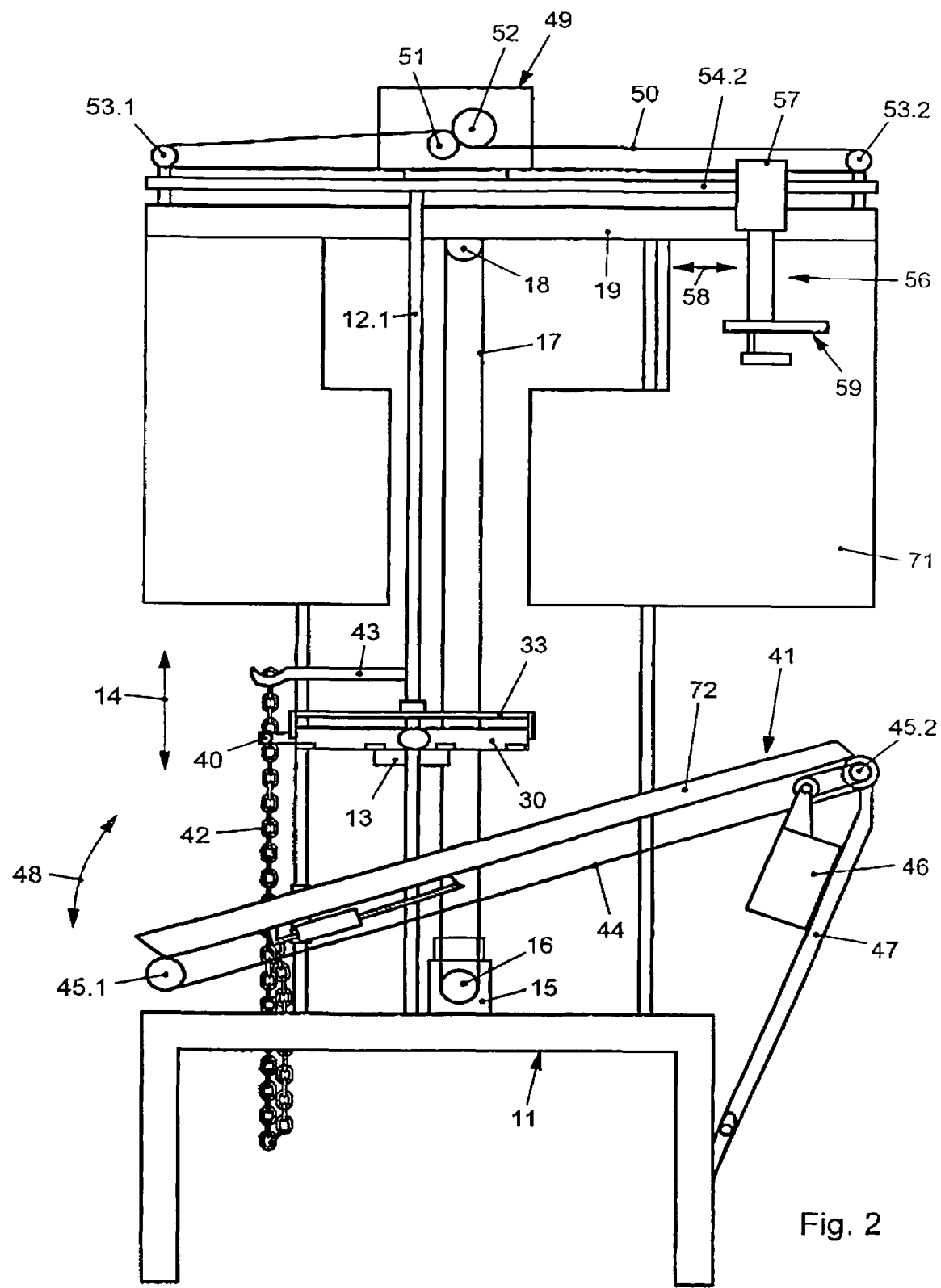
FIG. 2: shows a front view of a part of the handling system according to FIG. 1.

The handling device 3 has a base frame 11 from which a number of guide pillars 12.1 and 12.2 protrude. A vertical slide 13 is situated on the guide pillars 12.1 and 12.2 and can be adjusted vertically along these guide pillars 12.1 and 12.2. This is indicated in FIG. 2 by the double arrow 14.

The movement of the vertical slide 13 vertically is taken on by a drive 15 which fits on the base frame 11. A belt 17

(preferably a toothed belt) is connected to the drive 15 or to a driving wheel 16 and at the other end is looped around a deflection pulley 18 on a crossmember 19. This belt 17 is connected to the vertical slide 13.

Figure 3:
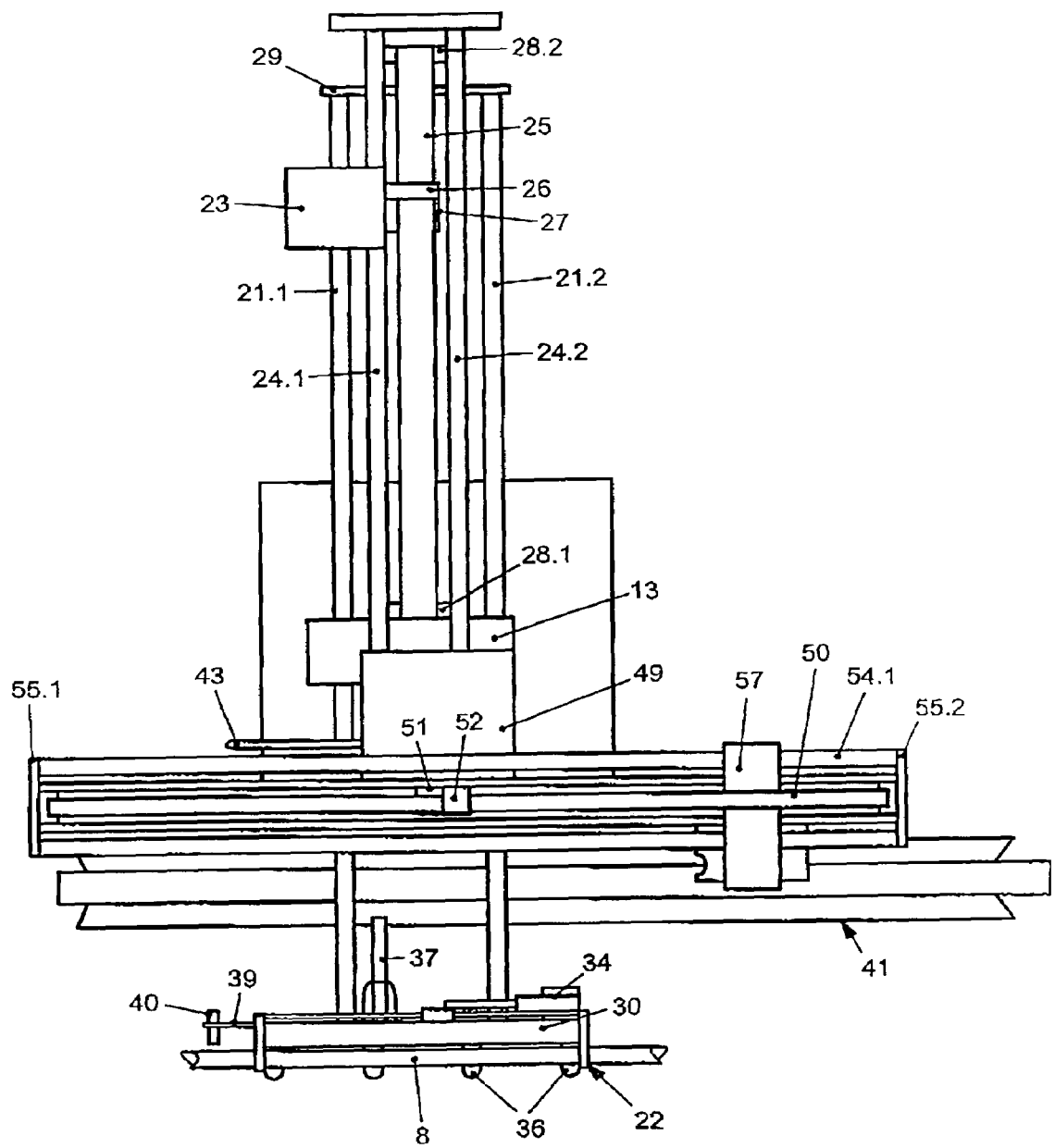
FIG. 3: shows a plan view of the part of the handling system according to FIG. 2.

A horizontally extendable gripping arm 20, on whose front end, facing the trolley 2, a gripper 22 is situated, is situated on the vertical slide 13. In this case, the gripping arm 20 preferably has two sliding rods 21.1 and 21.2 (see FIG. 3) which are mounted in corresponding guide bushings in the vertical slide 13.

The sliding rods 21.1 and 21.2 are retracted and extended by means of a drive 23 which sits on a supporting rod 24 which, in turn, is likewise connected to the vertical slide 13. A further toothed belt 25, which runs between a drive shaft 26 and a mating wheel 27 on the drive 23, is provided for connection to the drive 23. Furthermore, the toothed belt 25 loops around two deflection pulleys 28.1 and 28.2 and is connected to a crossbar 29 which, in turn, connects the two sliding rods 21.1 and 21.2.

Figure 4:
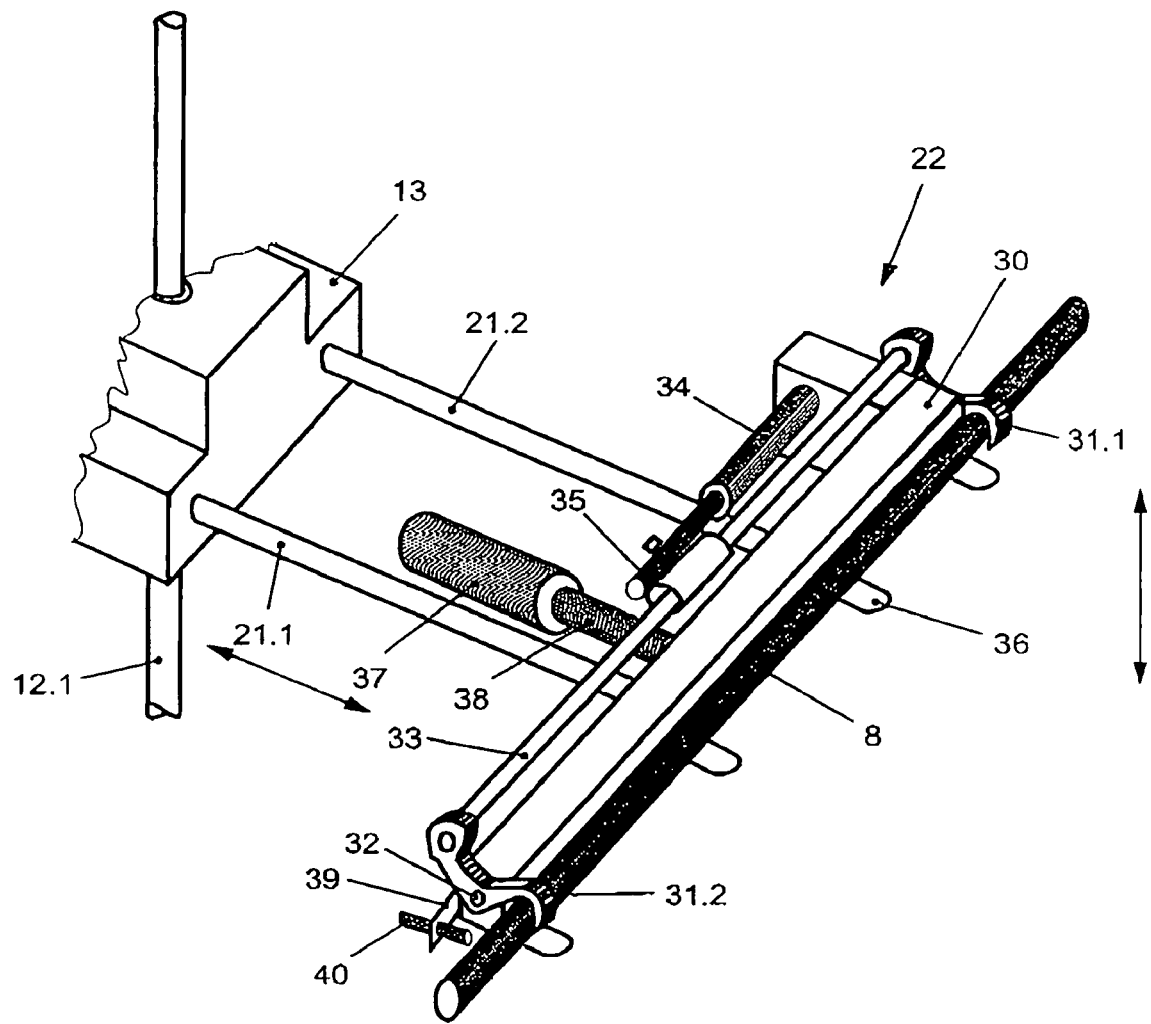
FIG. 4: shows an enlarged, perspective view of a gripping device.

As shown in particular in FIG. 4, the gripper 22 is coupled to the two sliding rods 21.1 and 21.2 via a crossbeam 30. Clamps 31.1 and 31.2 which each have a pivot point 32 with the crossbeam 30 are situated on both sides of the crossbeam 39. On the other side of the pivot point 32, they are connected to each other via a connecting rod 33, so that they can be pivoted together into the opening position and into the closed position. This takes place via a pneumatic cylinder 34 which acts upon the connecting rod 33. When a piston rod 35 is ejected out of the cylinder 34, because the cylinder 34 is connected in an articulated manner to the crossbeam 30, the connecting rod 33 is pivoted downward, so that the clamps 31.1 and 31.2 pivot about the pivot point 32 into the opening position. In this position they can receive a smoke stick 8, after which the smoke stick 8 is held on supports 36 by the clamps 31.1 and 31.2. This takes place by the piston rods 35 being retracted into the cylinder 34, in which case the connecting rod 33 is pivoted upward and the clamps 31.1 and 31.2 are therefore placed onto the smoke stick 8.

To eject the smoke stick 8, the piston rod 35 is extended, so that the connecting rod 33 pivots downward again about the pivot point 32 and the clamps 31.1 and 31.2 release the smoke stick 8. A second pneumatic cylinder 37 is then set into action and its piston rod 38 acts upon the smoke stick 8 and pushes the latter downward from the supports 36.

A tongue 39 on which an approach sensor 40 is situated, said sensor recognizing the presence of a smoke stick 8, protrudes from the crossbeam 30.

In FIG. 2, it is indicated that a transporting device 41 is connected to the vertical slide 13 via a chain 42. At one end, the chain 42 is fastened to the transporting device 41 in the vicinity of the free end thereof and at the other end it is suspended on a supporting finger 43 which is assigned to the vertical slide 13.

The transporting device 41 has a conveyor belt 44 which loops around two deflection pulleys 45.1 and 45.2. The deflection pulley 45.2 is assigned a drive 46 for the conveyor belt 44. Furthermore, the deflection pulley 45.2 is situated on a supporting strut 47 which, in turn, is connected to the base frame 11. In the region of the deflection pulley 45.2, the transporting device 41 is arranged in a manner such that it can be pivoted with respect to the supporting strut 47 in the direction of the double arrow 48.

The two guide pillars 12.1 and 12.2 are connected to each other at their upper, free ends by a covering 49. This covering 49 contains a further drive for a toothed belt 50, this toothed belt 50 running between a drive shaft 51 and a mating wheel 52. Furthermore, the toothed belt 50 circulates around two deflection pulleys 53.1 and 53.2 which are arranged on guide rails 54.1 and 54.2. These guide rails 54.1 and 54.2 run transversely with respect to the guide pillars 12.1 and 12.2 and are connected to each other by end crossbars 55.1 and 55.2 and are fastened as a whole to the covering 49.

The guide rails 54.1 and 54.2 serve for guiding a cutting device 56, a transverse slide 57 sliding along the guide rails 54.1 and 54.2. This transverse slide 57 is connected to the toothed belt 50.

A supporting arm 58 protrudes downward from the transverse slide 57. A cutting plate 59, which is shown in greater detail in FIG. 6, is suspended on said supporting arm. The cutting plate 59 has an approximately square hollow profile 60 in which a lower cutting plate 61 (indicated by dashed lines) having an undercut cutting opening 62 is fixed. A displaceable cutting plate 63, which likewise has an undercut cutting opening 64, rests on this lower cutting plate 61. The cutting opening 64 is arranged in the clear width of the cutting opening 62.

In order to move the cutting plate 63 on the cutting plate 61, a pneumatic cylinder 65 which is connected to the hollow profile 60 is provided. Its piston rod 66 acts via a transverse arm 67 and a connecting pin 68 on the upper cutting plate 63 and displaces the latter on the lower cutting plate 61, so that the cutting opening 62 is reduced in size or closed by the cutting opening 64.

An approach sensor 70 is situated on a holding tab 69 below the cutting plate 59.

The manner in which the present invention functions is as follows:

The trolley 2 with the sausages 1 on the strings 9 is brought up to the handling device 3. For the transfer of a smoke stick 8, the vertical slide 13 moves with the gripper 22 to approximately level with the smoke stick 8 which is to be removed. For this purpose, additional markings which are recognized by a sensor on the handling device 3 can be provided, for example, on the trolley 2, or else a standardized height of the longitudinal carriers 6.1 to 6.3 is set in the program of the handling device 3.

The gripper 22 is now extended horizontally by the drive 23 being set into action. The gripper 22 travels as far as the smoke stick 8 which is to be removed, the sensor 40 recognizing when a desired position of the gripper 22 in the vicinity of the smoke stick 8 is reached.

The cylinder 34 and the piston rods 35 are used to open the clamps 31.1 and 31.2, the gripper 22 is advanced even further toward the smoke stick 8, the clamps 31.1 and 32.2 transfer the smoke stick 8 onto the supports 36 with which the smoke stick 8 has been transferred from the gripper 22.

The drive 23 is now set into the reverse direction of rotation, so that the gripper 22 is withdrawn from the trolley 2. The vertical slide 13 is moved upward along the guide pillars 12.1 and 12.2, this taking place by means of the drive 15. As it is being moved upward, the vertical slide 13 also carries along the transporting device 41, via the chain 42, so that said transporting device is suspended in an approximately horizontal position approximately below the gripper 22.

The vertical slide 13 is moved to a height that the gripper 22 is situated approximately above the cutting plate 56, i.e. the region of the string 9 between the smoke stick 8 and clip 10 is arranged approximately level with the cutting openings 62 and 64.

The cutting device 56 is now brought up to the sausage 1, the sensor 70 recognizing an approach to the string 9. This sensor 70 determines when the string 9 is situated in the cutting openings 62/64. As soon as this is the case, the cylinder 65, and therefore the piston rod 66, is actuated, so that the upper cutting plate 63 is displaced and the clear width between the cutting openings 62/64 is eliminated. The sausage 1 is therefore cut off from the smoke stick 8. It falls, guided along an apron 71 and by other guiding plates 72, onto the conveyor belt 44 and can now be supplied for further processing, for example packaging.

The handling device 3 according to the invention can also be designed for the purpose of handling smoke sticks 8 in any desired manner, for example for transferring them from a threading station into a trolley 2. In this case, the transporting device 41 and also the cutting device 56 are omitted. The apron 71 is also not necessary. In contrast, the guide pillars 12.1 and 12.2 are arranged rotatably on the base frame 11.

To pick up the smoke stick 8, use is made only of the gripper 22 on the gripping arm 20 which is arranged on the vertical slide 13 and can be displaced along the latter. The gripper 22 takes the smoke stick 8 from any desired processing and/or transporting position and transfers it into the trolley 2. This concept is also to be encompassed by the present invention.

The invention claimed is:

1. A handling system for sausages (1) comprises: a plurality of carriers in a supporting frame for handling sausages (1) on smoke sticks (8), the supporting frame (2) includes handling means (3) for removing the carriers from and/or inserting the carriers into the supporting frame (2), the handling means includes a gripping device, the gripping device has a horizontally extendable gripping arm (20) on which a gripper (22) is located, and further including means for displacing the gripping device vertically, wherein the means for displacing gripping arm (20) toothed belts (17, 25) and drives (23).

2. A handling system for sausages (1) comprises: a plurality of carriers in a supporting frame for handling sausages (1) on smoke sticks (8), the supporting frame (2) includes handling means (3) for removing the carriers from and/or inserting the carriers into the supporting frame (2), the handling means includes a gripping device, the gripping device has a horizontally extendable gripping arm (20) on which a gripper (22) is located, and the gripping arm (20) has a clamping device (31.1, 31.2) for gripping the smoke sticks (8).

3. The handling system as claimed in claim 2, wherein the gripping arm (20) has an ejection device (37) for ejecting the smoke sticks (8).

4. The handling system as claimed in one of claims 1 or 2, wherein the gripping device is associated with a cutting device (56) for cutting off the sausages (1) from the smoke sticks (8).

5. A handling system for sausages (1) comprises: a plurality of carriers in a supporting frame for handling sausages (1) on smoke sticks (8), the supporting frame (2) includes handling means (3) for removing the carriers from and/or inserting the carriers into the supporting frame (2), the handling means includes a gripping device, the gripping device has a horizontally extendable gripping arm (20) on which a gripper (22) is located, and the gripping device is associated with a cutting device (56) for cutting off the sausages (1) from the smoke sticks (8).

6. The handling system as claimed in one of claims 2 or 5, including means for displacing the gripping device vertically.

7. The handling system as claimed in claim 6, wherein the means for displacing gripping arm (20) toothed belts (17, 25) and drives (23).

8. The handling system as claimed in one of claims 1, 2 or 5, wherein the gripping arm (20) has at least one proximity sensor (40) which senses the position of the smoke sticks (8).

9. The handling system as claimed in one of claims 1 or 5, wherein the gripping arm (20) has a clamping device (31.1, 31.2) for gripping the smoke sticks (8).

10. The handling system as claimed in one of claims 1, 2 or 5, wherein the gripping device is situated on at least one guide pillar (12.1, 12.2).

11. The handling system as claimed in one of claims 1, 2 or 5, wherein the gripping device is associated with a transporting device (41).

12. The handling system as claimed in claim 11, wherein the transporting device (41) is situated below the gripping device and is connected rotatably at one end to a base frame (11) and is connected at the other end to the gripping device.

13. The handling system as claimed in claim 5, wherein the cutting device (56) is situated on a guide rail (54.1, 54.2).

14. The handling system as claimed in claim 13, wherein the guide rail (54.1, 54.2) is located transversely with respect to the guide pillar (12.1, 12.2) to the gripping device.

15. The handling system as claimed in one of claims 2 or 5, wherein the sausages (1) are connected to the smoke stick (8) by a strings, and wherein a clip (10) is situated on the string (9).

16. The handling system as claimed in claim 13, wherein the cutting device (56) has an approach sensor (70).

17. The handling system as claimed in one of claims 1, 2 or 5, wherein the gripping device is arranged rotatably.

* * * * *